US012403619B2

(12) United States Patent
Holmes

(10) Patent No.: US 12,403,619 B2
(45) Date of Patent: Sep. 2, 2025

(54) HAIR CLIPPERS WITH FLEXING ELECTRICALLY ADJUSTABLE BLADES

(71) Applicant: Lonnie Andrew Holmes, Coram, NY (US)

(72) Inventor: Lonnie Andrew Holmes, Coram, NY (US)

( * ) Notice: Subject to any disclaimer, the term of this patent is extended or adjusted under 35 U.S.C. 154(b) by 667 days.

(21) Appl. No.: 17/546,841

(22) Filed: Dec. 9, 2021

(65) Prior Publication Data

US 2022/0219343 A1 Jul. 14, 2022

Related U.S. Application Data

(60) Continuation-in-part of application No. 16/547,535, filed on Aug. 21, 2019, now Pat. No. 11,198,229, which is a continuation of application No. 15/677,018, filed on Aug. 15, 2017, now Pat. No. 10,391,646, which is a continuation of application No. 14/622,554, filed on Feb. 13, 2015, now Pat. No. 9,731,424, which is a continuation-in-part of application No. 13/727,274, filed on Dec. 26, 2012, now Pat. No. 9,352,476, which is a division of application No. 12/592,537, filed on Nov. 24, 2009, now Pat. No. 8,341,846.

(60) Provisional application No. 61/117,434, filed on Nov. 24, 2008.

(51) Int. Cl.

*B26B 19/04* (2006.01)
*B26B 19/02* (2006.01)
*B26B 19/20* (2006.01)

(52) U.S. Cl.

CPC ............ *B26B 19/048* (2013.01); *B26B 19/02* (2013.01); *B26B 19/046* (2013.01); *B26B 19/20* (2013.01); *B26B 19/205* (2013.01)

(58) Field of Classification Search

CPC ..... B26B 19/02; B26B 19/048; B26B 19/063; B26B 19/205; B26B 19/046; B26B 19/20; B26B 19/04

USPC .......... D28/44-54; 30/43.7-43.92, 194-204, 30/208-220

See application file for complete search history.

(56) References Cited

U.S. PATENT DOCUMENTS 1,516,635 A * 11/1924 Friedman .............. B26B 19/205 30/220
2,858,607 A * 11/1958 Kane ....................... B26B 19/16 30/43.6
2,903,789 A * 9/1959 Schleifer ................. B26B 19/28 30/43.9
3,287,805 A * 11/1966 Du Charme ............ B26B 19/20 30/202
6,243,955 B1 * 6/2001 Forbers ................... B26B 19/20 30/195

(Continued)

*Primary Examiner* — Jason Daniel Prone

(74) *Attorney, Agent, or Firm* — Alfred M. Walker

(57) ABSTRACT

A flex clipper provides a feature to help the cutting blade set float more effortlessly by adjusting automatically to the contours of a client's head to prevent getting stuck and causing cuts and irritation to the scalp. The hair clipper preferably also uses a self-contained motor-driven pivotable adjustment mechanism to adjust the relative position of the stationary and reciprocating blades of a common type of blade set. One or more on/off switches operable by the thumb of the hand holding the clipper to afford a barber total automatic adjustment with the clipper itself in an on or off condition.

5 Claims, 19 Drawing Sheets

(56) References Cited

U.S. PATENT DOCUMENTS

| | | | | |
|---|---|---|---|---|
| 7,581,319 | B1 * | 9/2009 | Little | B26B 19/06 30/210 |
| 8,127,453 | B2 * | 3/2012 | Haczek | B26B 19/048 30/43.92 |
| 8,341,846 | B1 * | 1/2013 | Holmes | B26B 19/20 30/208 |
| 9,352,476 | B1 * | 5/2016 | Holmes | B26B 19/20 |
| 9,731,424 | B1 * | 8/2017 | Holmes | B26B 19/02 |
| 10,391,646 | B2 * | 8/2019 | Holmes | B26B 19/063 |
| 11,198,229 | B2 * | 12/2021 | Holmes | B26B 19/20 |
| 11,534,932 | B2 * | 12/2022 | Johnson | B26B 19/20 |
| 11,577,414 | B2 * | 2/2023 | Buck, Jr. | B26B 19/063 |
| 2013/0326881 | A1 * | 12/2013 | Blatter | B26B 21/446 30/41 |
| 2022/0410420 | A1 * | 12/2022 | Reinprecht | B26B 19/20 |
| 2023/0077934 | A1 * | 3/2023 | Lin | B26B 19/046 30/539 |
| 2025/0135668 | A1 * | 5/2025 | Snow | B26B 19/205 |

* cited by examiner

TOP VIEW
SCALE: N.T.S.

ISO VIEW
SCALE: N.T.S.

SIDE VIEW
SCALE: N.T.S.

END VIEW
SCALE: N.T.S.

ISO VIEW
SCALE: N.T.S.

END VIEW
SCALE: N.T.S.

TOP VIEW
SCALE: N.T.S.

SIDE VIEW
SCALE: N.T.S.

TOP VIEW
SCALE: N.T.S.

ISO VIEW
SCALE: N.T.S.

BOTTOM VIEW
SCALE: N.T.S.

END VIEW
SCALE: N.T.S.

ISO VIEW
SCALE: N.T.S.

END VIEW
SCALE: N.T.S.

TOP VIEW
SCALE: N.T.S.

SIDE VIEW
SCALE: N.T.S.

TOP VIEW
SCALE: N.T.S.

ISO VIEW
SCALE: N.T.S.

SIDE VIEW
SCALE: N.T.S.

END VIEW
SCALE: N.T.S.

HAIR CLIPPERS WITH FLEXING ELECTRICALLY ADJUSTABLE BLADES

RELATED APPLICATIONS

This application is a continuation-in-part of application Ser. No. 16/547,535, filed on Aug. 21, 2019, now U.S. Pat. No. 11,198,229 B2, issued Dec. 14, 2021, which '535 application is a continuation of application Ser. No. 15/677,018, filed Aug. 15, 2017, now U.S. Pat. No. 10,391,646 B2 issued Aug. 27, 2019, which '018 application is a continuation of application Ser. No. 14/622,554 filed Feb. 13, 2015, now U.S. Pat. No. 9,731,424 issued Aug. 15, 2017, which '554 application is a continuation-in-part of application Ser. No. 13/727,274, filed on Dec. 26, 2012, now U.S. Pat. No. 9,352,476 issued May 31, 2016, which '274 application is a divisional of application Ser. No. 12/592,537, filed on Nov. 24, 2009, now U.S. Pat. No. 8,341,846 issued Jan. 1, 2013, which '018, '554, '274 and '537 applications are incorporated by reference herein. Applicant claims priority under 35 U.S.C. § 120 therefrom. application Ser. No. 12/592,537 is based upon provisional application Ser. No. 61/117,434 filed Nov. 24, 2008, which application is also incorporated by reference herein. Applicant claims priority under 35 USC § 119(e) therefrom.

FIELD OF THE INVENTION

The present invention relates to hair cutting.

BACKGROUND OF THE INVENTION

Electrically operated hair clippers have been used for many years. Some of the commonly available models have a manual lever on the side to incrementally adjust the relative position between the stationary and the reciprocating blades in a blade set to adjust the minimum length of hair that is being clipped. Other prior art patents show infinite adjustability over a range. The prior art does not reveal motor-powered continuous adjustability of the blade set which affords the barber the ability to perform the adjustment even during the clipping activity by simply activating a switch and/or having a flexing compliance blade set that adjusts around the contours of the scalp of a flex clipper is described which, in addition to the aforementioned powered hair cutting length adjustment feature, provides an additional feature to help the cutting blade set float more effortlessly by adjusting automatically to the contours of a client's head, to prevent the blade set getting stuck and causing cuts and irritation to the scalp of the customer.

OBJECTS OF THE INVENTION

It is therefore an object of the present invention to provide a flexing hair clipper with a flexing cutting blade adjuster which adjusts automatically to the contours of a client's head to prevent the blade set getting stuck and causing cuts and irritation to the scalp.

It is also an object of the present invention to provide a hair clippers device with infinitely variable blade distances from the scalp of the patron.

Other objects which become apparent from the following description of the present invention.

SUMMARY OF THE INVENTION

The hair clippers of this invention use a self-contained motor-driven adjustment mechanism to adjust the relative position of the stationary and reciprocating blades of a common type of blade set, preferably with a flexing blade set to adjust to the contours of the scalp of the customer having his or her hair being cut and trimmed.

While other on/off switches can be used, preferably two momentary switches operable by the thumb of the hand holding the clipper afford a barber total automatic adjustment with the clipper itself in an on or off condition. There is no need for two-handed fidgeting or selection of only a few discrete increments of length adjustment as with the commonly available models. Since the small gear motors used for the adjustment are brush type or brushless permanent magnet motors which are operated by direct current, the adjustment feature is most compatible with cordless clippers already using an on-board DC source in the form of a re-chargeable battery to drive the reciprocating blade. The invention will be described as a modification of a cordless clipper, although AC driven corded type clippers can also be modified with this feature by the addition of an on-board AC to DC power supply for the adjustment motor.

In the first embodiment, a modified blade set is used such that a gear rack is attached to the stationary blade. It is engaged with a worm gear pinion driven by a low-speed gear motor through a reversible drive circuit. Either limit switches, limit sensors, or over-current sensors are used to disable the adjustment motor at either the long or short hair end limits. The motor then can only be driven in the opposite direction.

In the second embodiment, a conventional blade set is used. The modification is such that a motor-driven final gear replaces the manual handle thereby retaining the original mechanism (of any type) that is used to move the stationary blade relative to the reciprocating blade in the conventional blade set. A timing belt bushing couples a rear mounted adjustment motor to a front side-mounted gear train coupled to the shaft of the blade shifting mechanism. Attached to the timing belt bushing for linear back and forth excursions is a magnet with a pointer. The magnet is used to operate two normally closed magnetic reed switches placed at the opposite distal ends of the permissible excursion thereby serving the limit switch function. The pointer moves over a tri-colored linear scale viewable by the barber from the top of the hair clipper; this quickly indicates the hair length setting. A plastic housing cover over the adjustment motor at the back and over the timing belt bushing and gear train at the side encloses the entire compact mechanism.

In a third embodiment, a flex clipper is described which, in addition to the aforementioned powered hair cutting length adjustment feature, provides an additional feature to help the cutting blade set float more effortlessly, by adjusting automatically to the contours of a client's head to prevent getting stuck and causing cuts and irritation to the scalp.

To achieve this automatic adjustment, the blade set with motor driven length adjuster in now housed in a separate module. Compliance is introduced between this module and the main housing of the flex clipper. The blade set can now tilt a small amount in any direction to automatically adjust to the local scalp contours while the cutting process is controlled as usual by grasping the main housing. The rigid attachment of the blade set to the housing is replaced by a flexing compliant attachment. Two methods are described, one is by using a large diameter short bellows while the other method uses a short length (a ring) of thick-walled elastomeric foam tubing which provides a similar function.

Both flexing compliant attachments permit tilting and a small amount of linear axial movement between blade set and main housing, but both resist any relative rotational movement between blade set and main housing. This rotational resistance ensures good control of the blade set by keeping the cutting edge always aligned with the top surface of the housing (as in a normal rigid attachment) except for any minor local tilting. This rotational stiffness must also resist the driving torque of the motor driving the reciprocating cutter blade.

Since the drive motor for the reciprocating cutter blade is in the main housing and the crank mechanism and blade set are in a separate module, a flexing compliant motor coupling that can follow any blade movements relative to the main housing is required. A metal bellows coupling of a diameter which fits inside the hollow interior of coupling bellows or foam ring is used. To keep the mass and size of the forward blade set module low, a modified cutting length adjuster mechanism is used; for example, in one embodiment, it uses a miniature stepper motor with a lead screw. The powering and control cable from the stepper motor driver in the main housing is also guided through the hollow interior of the coupling member.

The flexing compliance (i.e., spring characteristics) of the coupling member as well as the damping characteristics can be determined by the geometric design and material selected. The proper “feel” can be achieved through simulation and actual prototype testing known to those skilled in the art of hair clippers technology. While the damping characteristics are not as important as the compliance, they determine the smoothness and sound deadening performance. For the bellows, a wide variety of thermoplastic elastomers (TPE’s) or rubbers can be used. By using thin material crossection, even normally rigid plastics such as nylons or polypropylene can be used. Geometric design of the bellows includes overall length and diameter as well as number and shape of convolutions. By using filled TPE’s or alloys of rubber/TPE a wide variety of damping characteristics can be designed in. Foamed rubbers or TPE’s can be used for a foam ring coupling; other parameters that can be selected include type of cell (open or closed) and size of the cells. Material selection must also pay attention to longevity and compatibility with lubricants and hair conditioners.

In a further alternate embodiment, as shown in FIGS. 14-23D, the blade set is also capable of flexing around the contours of the customer’s hair, scalp and skull. Power is applied to the blade set by a conventional motor within the handset housing of the clippers. The motor may be activated by conventional tap switches, rotating wheel switches, or other manually activated switches. Instead of a flexible cylindrical neck, as in the aforementioned flexing embodiment, in this embodiment, the blade set is pivotable upward from a first position to a second position, whereby the blade set is controlled by a semi-rigid flexible belt bushing piece, i.e. known as a “flexor” which is positioned on the bottom of the clippers housing and which includes a semi-rigid flexible curved distal end which biases against a portion of the blade set to urge the blade set to move around the contours of the customer’s hair, scalp and skull during the process of a hair cutting. The flexor counteracts the propensity of the upwardly pivoted blade set to pivot outwardly and holds the blade set in a mid-point position so that the blade set can push in or push out while moving over the three-dimensional curvature of the hair, scalp and skull of the customer. The flexor gently pushes the pivoted blade set to a flexing motion or a relaxed motion against the hair, scalp and skull of the customer. The moving blade of the blade set moves horizontally against the stationery blade of the blade set during the cutting of the hair. A spring is provided to hold the movable blade and the stationery blade closely adjacent and parallel to each other. The spring is located under a driver which has a driver bracket attached to the blade set. The driver moves the movable blade against the stationery blade to facilitate cutting of the hair on the scalp and skull of the customer. The movable blade is moved closely adjacent and parallel to the stationery blade, by an eccentric rotating cam which is powered by the motor (such as for example the motor M in the other embodiment shown in drawing FIG. 8) inside the housing of the hair clippers. The eccentric cam causes the driver to move the movable blade of the blade set adjacent to the stationery blade in subsequent left and right sets of multiple parallel movements, during cutting of the hair of the scalp and skull of the customer. The rod of the rotating cam is positioned between an open U-shaped driver and causes the movement of the movable blade against the adjacent surface of the stationery blade. The U-shaped driver is mounted to a driver bracket which is attached to the blade set, and urges the blade set forward or back in an infinitely variable range of motion, limited by the pushing or release of the flexor against the pivoted blade set. A pivot mount is attached to a pivot plate which pivots the blade set and pivots about a pin, which connects the movable pivot plate and blade set to the stationery pivot mount, which is mounted to a base. The base is preferably connected to a three-sided shroud which covers the two sides and front of the pivoting mechanisms in front of the pivotable blade set.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE INVENTION

Figure 1:
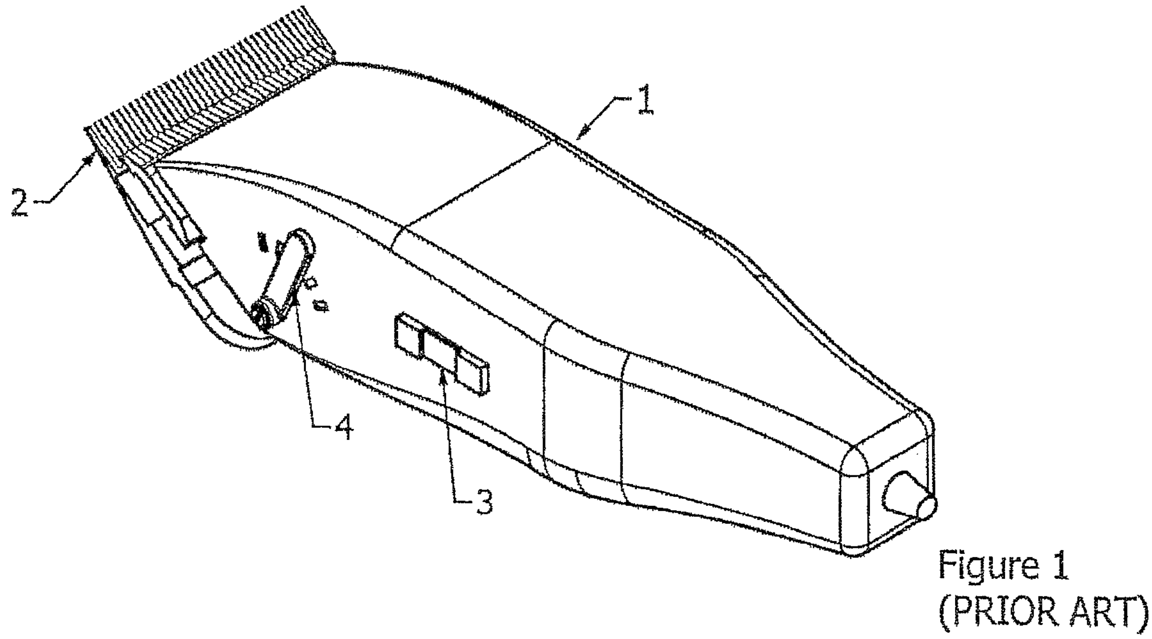
Figure 1 (PRIOR ART)
FIG. 1 is a perspective view of a typical prior art hair clipper with manual adjustment lever at the side.
Figure 2:
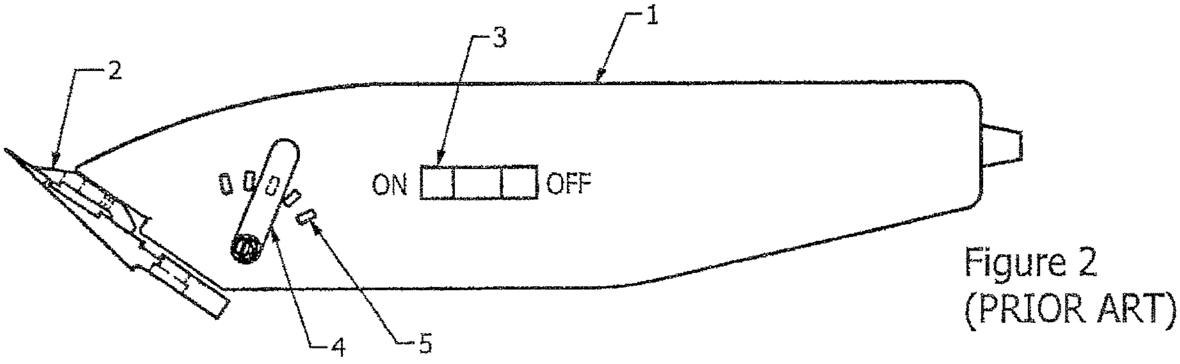
Figure 2 (PRIOR ART)
FIG. 2 is a side elevation of the prior art hair clippers of FIG. 1.

FIGS. 1 and 2 show two views of a conventional cordless electric hair clipper 1 with on/off switch 3, conventional blade set 2, and side manual incremental adjusting handle 4. The detents 5 engage handle 4 to set the minimum hair cutting length at one of the selections.

Figure 3:
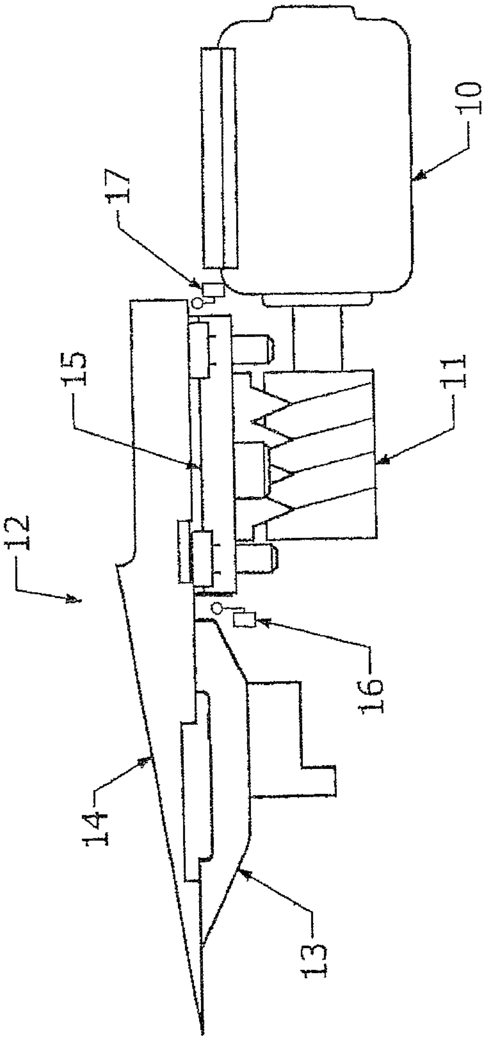
FIG. 3 is a side elevation of a motor-driven mechanism for adjusting the stationary blade of a clipper blade set showing a rack and worm gear pinion of the first embodiment.
Figure 4:
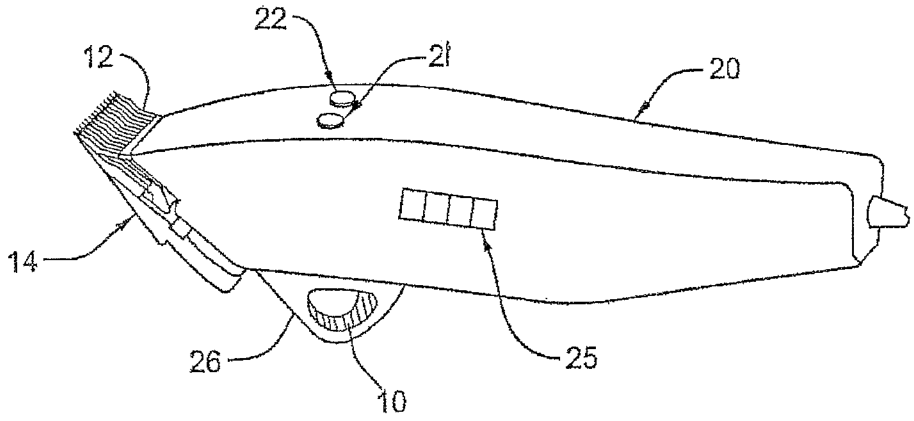
FIG. 4 is a perspective view of the hair clipper of this invention incorporating the mechanism of FIG. 3.
Figure 4A:
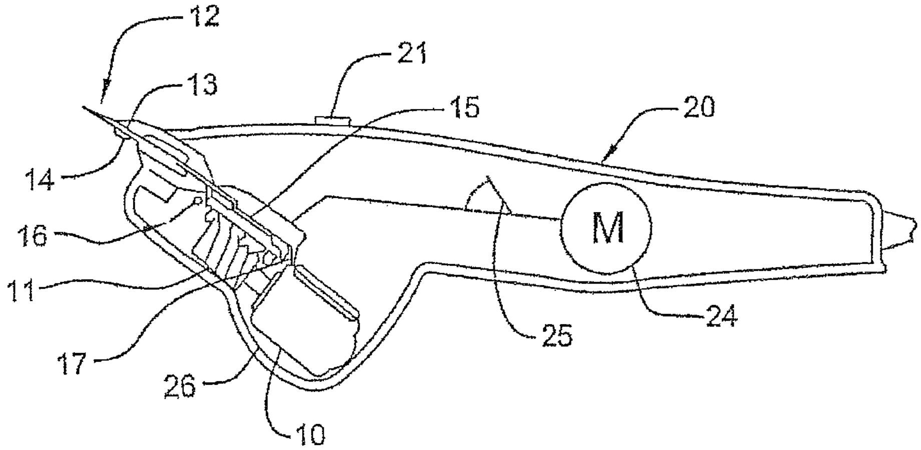
FIG. 4A is a side view in crossection of the hair clipper of this invention, showing the primary motor therein.

FIG. 3 shows the mechanism which uses gear motor 10 driving worm gear pinion 11 to perform an adjustment of stationary blade 14 relative to reciprocating blade 13 in blade set 12. A gear rack 15 subassembly is attached to blade 14 and engages pinion 11. Also shown in this view are limit switches 16 and 17 at the longest and shortest settings respectively. FIGS. 4 and 4A show clipper housing 20 with the adjustment feature. Conventional on/off switch 25 connected to clipper motor 24 (shown schematically as an encircled "M") is at one side while momentary (or "tap") switches 21 and 22 on the top surface are used to energize gearmotor 10 in a direction toward longer settings or shorter settings respectively. Gearmotor 10 is enclosed in descending housing 26, which descends below clipper housing 20. While FIGS. 3, 4 and 4A show a worm gear, it is anticipated that other gears may be used, such as rack and pinion gears or other gears known to those skilled in the art.

Figure 5:
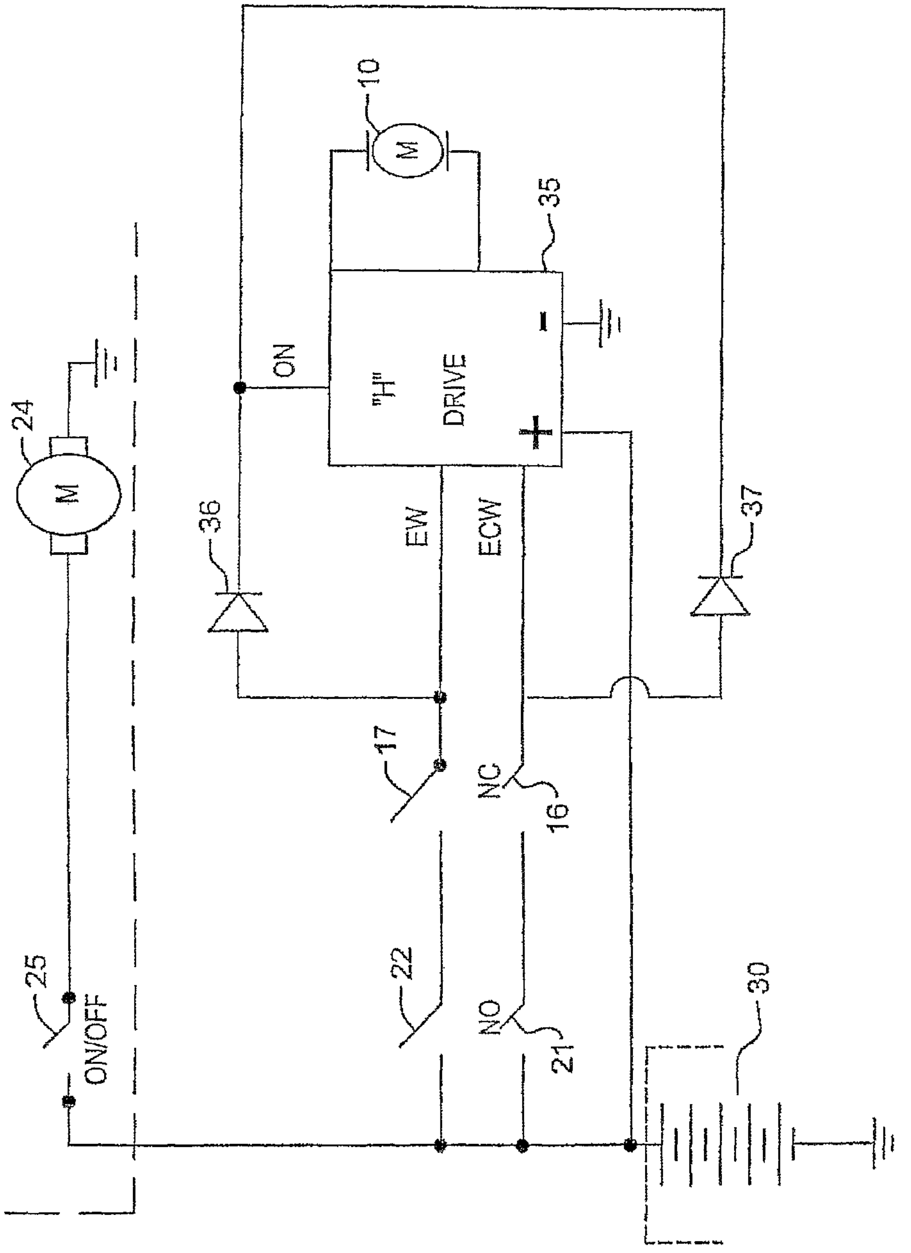
FIG. 5 is a wiring diagram of the adjustment motor using an “H-bridge” type of reversible driver.

FIG. 5 is a wiring diagram for the first embodiment of FIGS. 3 and 4 wherein gearmotor 10 is a simple brush type permanent magnet type driven by a common "H-bridge" drive module 35. Battery 30 is used primarily to power clipper motor 24 through on/off switch 25. It is also used as the power source for the adjustment feature. Drive module 35 has two direction inputs for clockwise and counterclockwise operation, an "ON" input, and power input and motor output connections as shown. In operation, if normally open switch 22 is pushed, a signal will flow through normally closed limit switch 17 energizing the ON input through isolation diode 36; motor 10 will be driven clockwise until either switch 22 is released or limit switch 17 is opened at the end of the excursion. Similarly, if switch 21 is pushed, counterclockwise operation is achieved through limit switch 16 and isolation diode 37. Once a limit switch is opened, motor 10 can only be driven in the opposite direction until the open limit switch is again closed.

Figure 6:
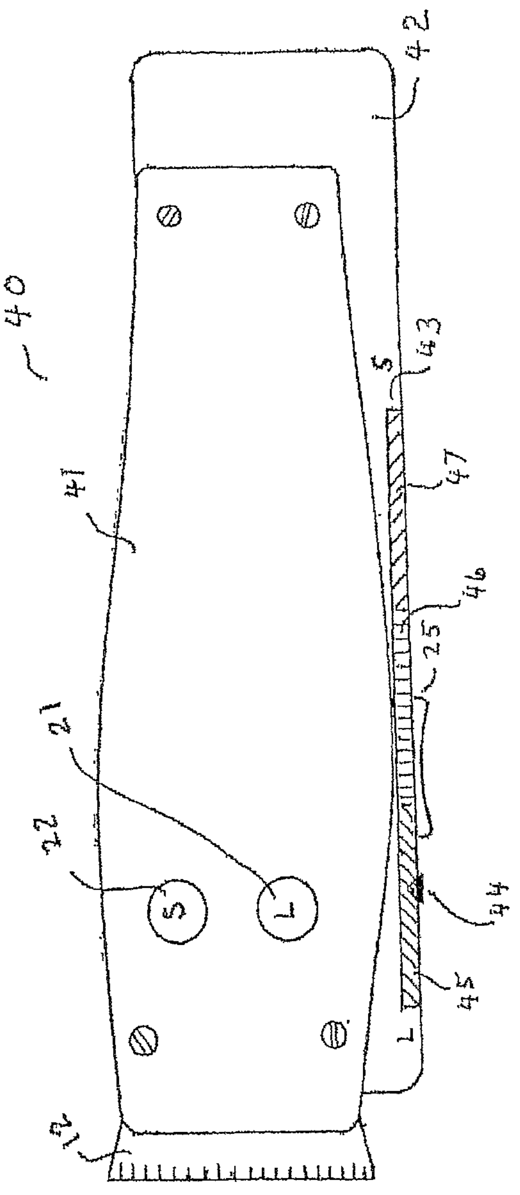
FIG. 6 is a top view of a second embodiment hair clipper with motor-driven adjustment of this invention.
Figure 7:
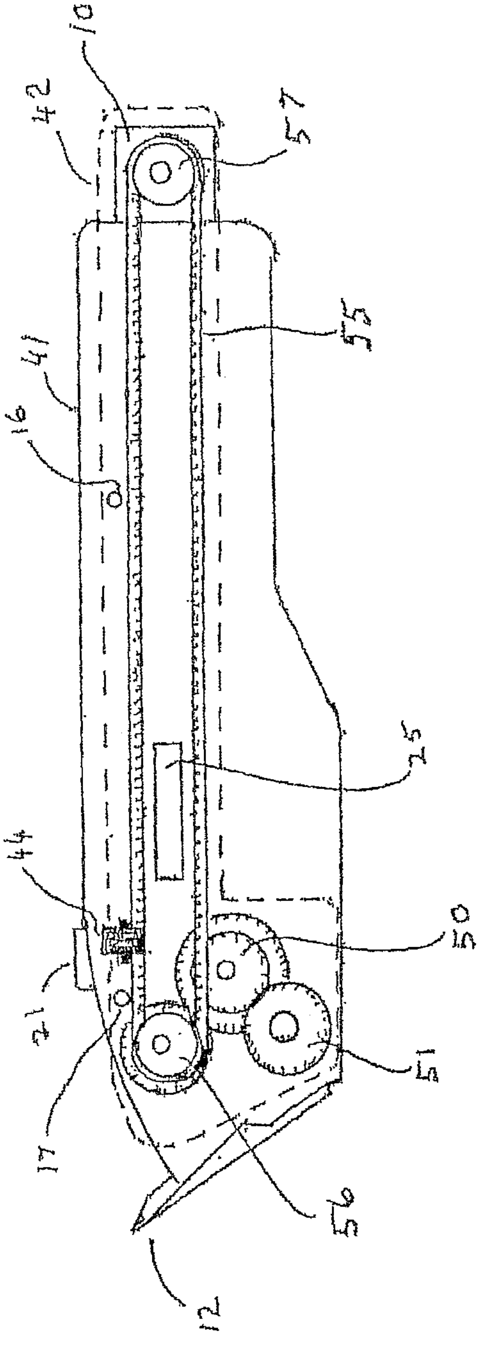
FIG. 7 is a side elevation of the second embodiment clipper with the housing cover removed to reveal the timing belt bushing and gear train mechanism.

FIGS. 6 and 7 show top and side views of the second embodiment of motor-driven minimum hair length adjustable hair clippers. The same circuit shown in FIG. 5 is completely applicable to this embodiment as well. The same momentary ("tap") switches 21 and 22 are used to control motor 10 which is now placed at the back end of hair clipper 40. Except for the addition of switches 21 and 22, the housing 41 and internal mechanism is identical to that of the prior art cordless clipper shown in FIGS. 1 and 2. In this embodiment, a conventional blade set 12 and internal blade adjusting mechanism is used. The feature of this embodiment couples through the shaft formerly engaged with a manual handle 4. This is shown at the center of output gear 51. In the top view of FIG. 6, housing cover 42 is a plastic shell used to enclose the feature mechanism. In FIG. 7, this cover 42 is removed to reveal the mechanism; the position is shown in dashed lines. On the top edge of cover 42 is a tri-colored strip 43 with green region 45 denoting the long settings, yellow region 46 denoting medium length settings, and red region 47 denoting short settings. This scale is meant to be read relative to the position of pointer assembly 44 which is attached to timing belt bushing 55 transmitting power and torque from pulley 57 mounted on motor 10 to pulley 56 attached to the input gear of gear train 50.

Gear train 50 is used to adjust the torque at output gear 51 and to match the speed and torque of gear motor 10 and the desired indicating excursion of belt bushing 55 so as to form an ergonomic range. Besides the pointer on top, pointer assembly 44 also carries a small powerful magnet to operate limit switches 16 and 17 which are now implemented as normally closed magnetic reed switches. On/off switch 25 fits between timing belt bushing 55 and pokes through a side switch hole in housing cover 42. While FIGS. 6 and 7 show a particular embodiment for an exterior mounted embodiment, it is anticipated that other exterior mounted embodiments may be used, such as those known to those skilled in the art.

While this third embodiment will be described as for a flex hair clipper with both powered hair cutting length adjustment as well as flexing compliance introduced between the main housing and blade set module, it should be noted that the flexing compliance feature to permit the blade set to automatically adjust to scalp contours and irregularities can be afforded to hair clippers without the powered hair cutting length adjustment. If the latter feature is not implemented, the blade set module will just contain the blade set and crank mechanism with coupling to the drive motor in the main housing which operates the reciprocating cutting blade; there would not be a cutting length adjustor motor, adjuster mechanism attached to the comb plate, nor a housing for the adjuster motor.

Figure 8:
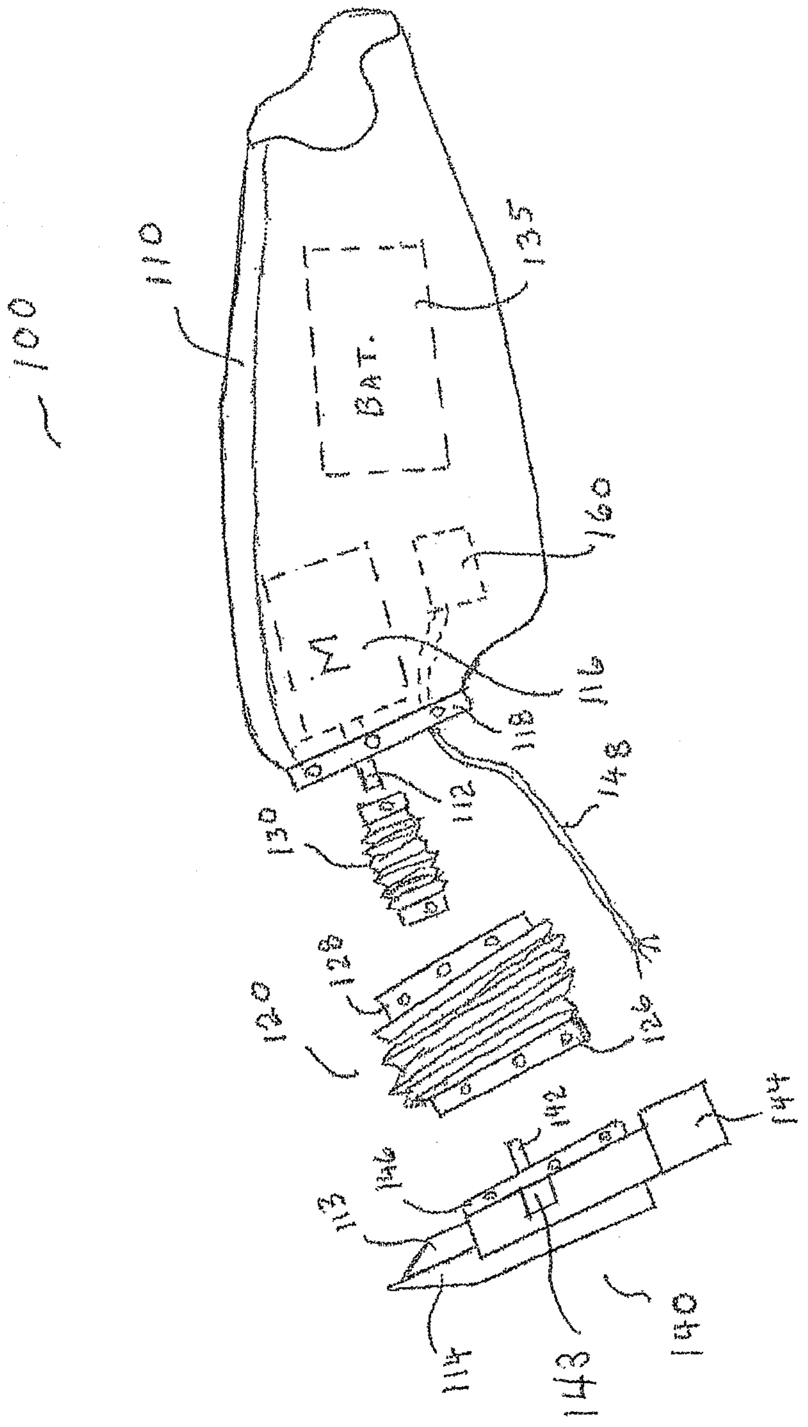
FIG. 8 is a side exploded elevation of the flex clipper embodiment of this invention.

FIG. 8 shows an exploded view of the major components of this embodiment. Flex clipper 100 has main housing 110 which contains drive motor 116 with shaft 112 which drives the reciprocating cutter blade 113, rechargeable battery 135 (unless it is an AC driven corded model), and an electronic driver module 160 for the hair cutting length adjuster motor 145 located in blade set module 140 at the left of the FIG. 8. Rigid coupling ring 118 is attached at the coupling end of housing 110. Blade set module 140 carries adjustable comb plate 114, reciprocating cutter blade 113, internal crank mechanism 143 for reciprocating cutter blade 113, drive shaft 142 for crank mechanism 143, housing 144 for internal hair length adjustment motor 145, internal hair length adjustment direct comb plate mechanism 114 (shown in FIG. 12), and a rigid coupling ring 146.

Also shown in FIG. 8 is molded compliant bellows 120 with integral mounting rings 126 and 128 is shown between blade module 140 and main housing 110, which it couples together. Metal bellows 130 couples drive motor 116 in main housing 110 and crank drive shaft 142 in blade module 140. Cable 148 powers and controls motor 145 for hair cutting length adjustment from electronic step driver module 160 contained in housing 144; it is passed through the hollow interior of bellows 120.

Figure 9:
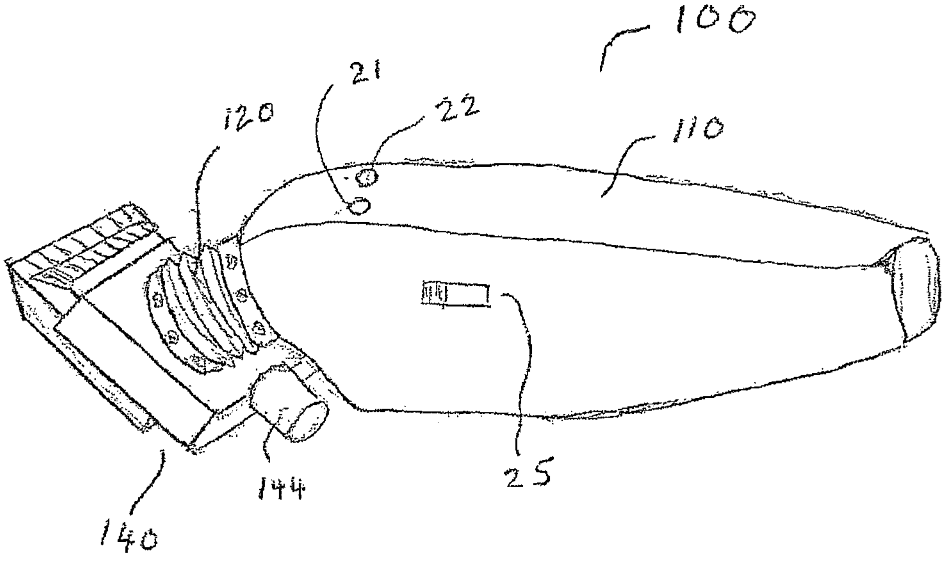
FIG. 9 is an assembled perspective view of the flex clipper of FIG. 8.

FIG. 9 shows an assembled flex clipper 100 showing tap switches 21 and 22 for adjusting cutting length and clipper operating switch 25. A thumb operable reverse direction wheel 23 can also be optionally used. Bellows 120 is shown coupling blade module 140 to housing 110 in a flexing compliant fashion. The length of bellows 120 as shown in FIGS. 8 and 9 may be shorter than shown based on the design and materials of the bellows. Bellows integral collars 126 and 120 fit over fixed collars 146 and 118 on blade module 140 and housing 110 respectively. Fasteners, such as self tapping screws, are used to secure the bellows collars to collars 146 and 118 which preferably have transverse holes in registration.

Figure 10:
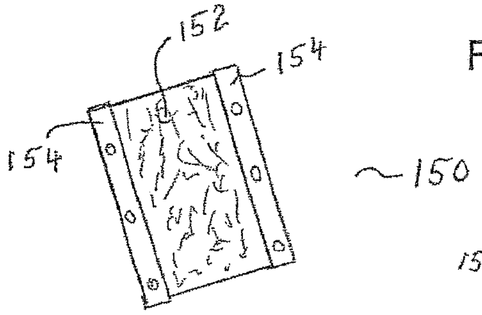
FIG. 10 is a side elevation of a compliant coupling between blade set module and main housing based on the use of an elastomeric foam ring.

FIG. 10 shows an alternate embodiment of an assembly 150 of resilient foam ring 152 with attached metal collars 154, which are adhesively attached or vulcanized as appropriate to the collar material. The assembly 150 of FIG. 10 can be used in lieu of custom molded bellows 120. Depending on many variables known to those skilled in the hair clippers technology, such as desirable product life, product price point, manufacturing cost, performance, volume, and materials used, either the bellows or the foam ring assembly 150 may be the better choice.

Figure 11:
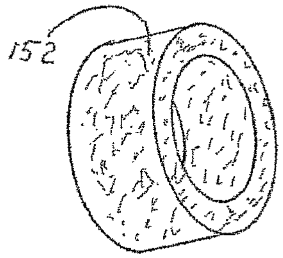
FIG. 11 is a perspective view of an elastomeric foam ring.

FIG. 11 shows a perspective view of the foam ring prior to attachment of coupling rings 154.

Although other types of flexing compliant motor couplings can be used, such as a variety of spring type couplings, the preferred coupling between shaft 112 and shaft 142 for reciprocating blade drive is a metal bellows coupling 130 such as those supplied by Servometer of Cedar Grove, NJ. This type of coupling easily fits inside the hollow bellows 120 or foam ring 152 central hole while not interfering with the degrees of freedom of the bellows or foam ring.

Figure 12:
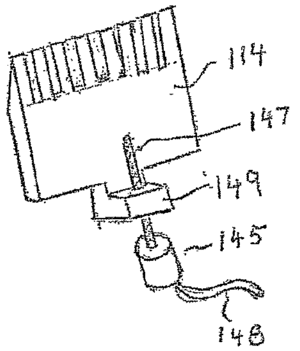
FIG. 12 is a perspective view of the cutting length adjuster mechanism as attached to the adjustable comb plate.

FIG. 12 shows the simple direct comb plate 114 adjustment mechanism which includes preferably stepper motor 145, and a fastening mechanism, such as, for example, threaded bracket 149 and fine lead screw 147. Although other methods can be incorporated, a stepper motor 145 is preferred to a DC gearmotor due to size and complexity. At about 6 mm diameter and 9.5 mm long, a FDM0620 stepper motor from Micromo of Clearwater, FL is very compact and is driven with 20 steps per revolution to drive lead screw 147.

Figure 13:
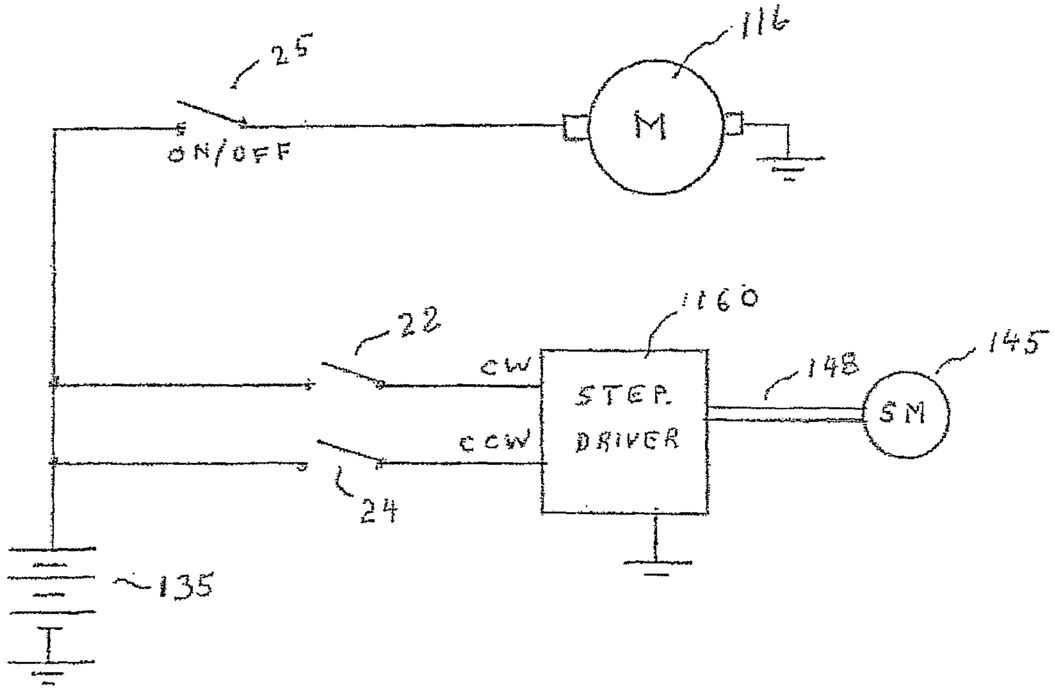
FIG. 13 is a high-level schematic diagram of the electrical elements of the flex clipper of this invention.
Figure 16:
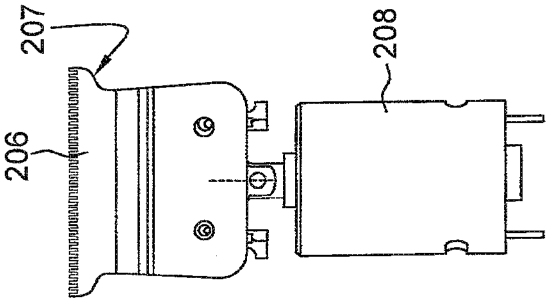
FIG. 16 is a front view thereof.

FIG. 13 shows a schematic diagram for the flex clipper. It is noted that no limit switches are required because step motors can just "lose steps" with no damage when a hard stop is encountered. Tap switches 22 and 24 determine the direction of rotation of stepper motor 145 by supplying the proper sequence of steps from step driver module 160 over cable 148. Reciprocating blade motor 116 for reciprocating cutter blade 113 is directly powered through switch 25. Battery 135 (or equivalent DC power supply for corded versions) supplies power to both reciprocating blade motor 116, and to stepper motor 145, through step driver module 160.

Figure 17:
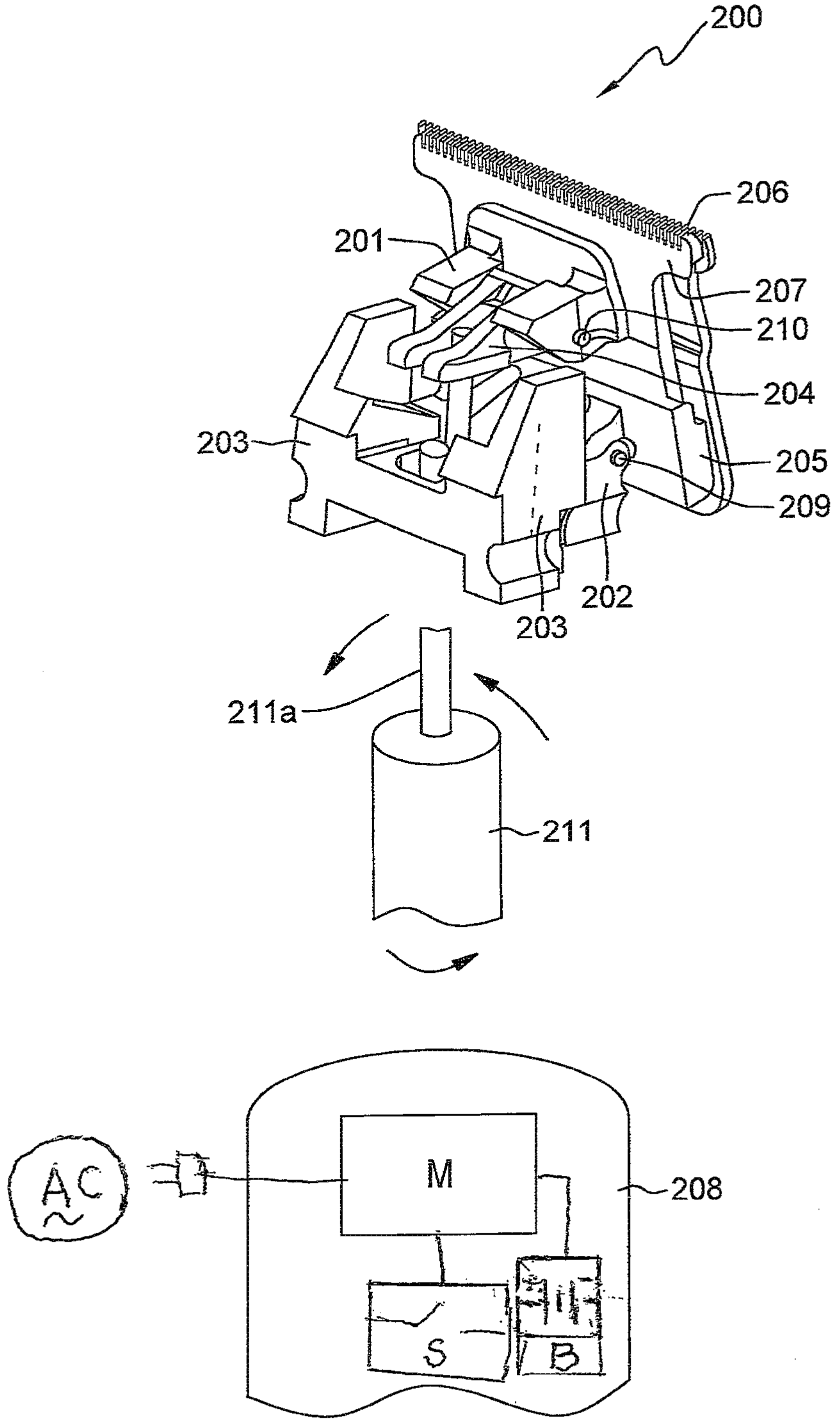
FIG. 17 is an exploded view of the motor, eccentric cam, driver, pivot set, and blade set thereof.
Figure 18:
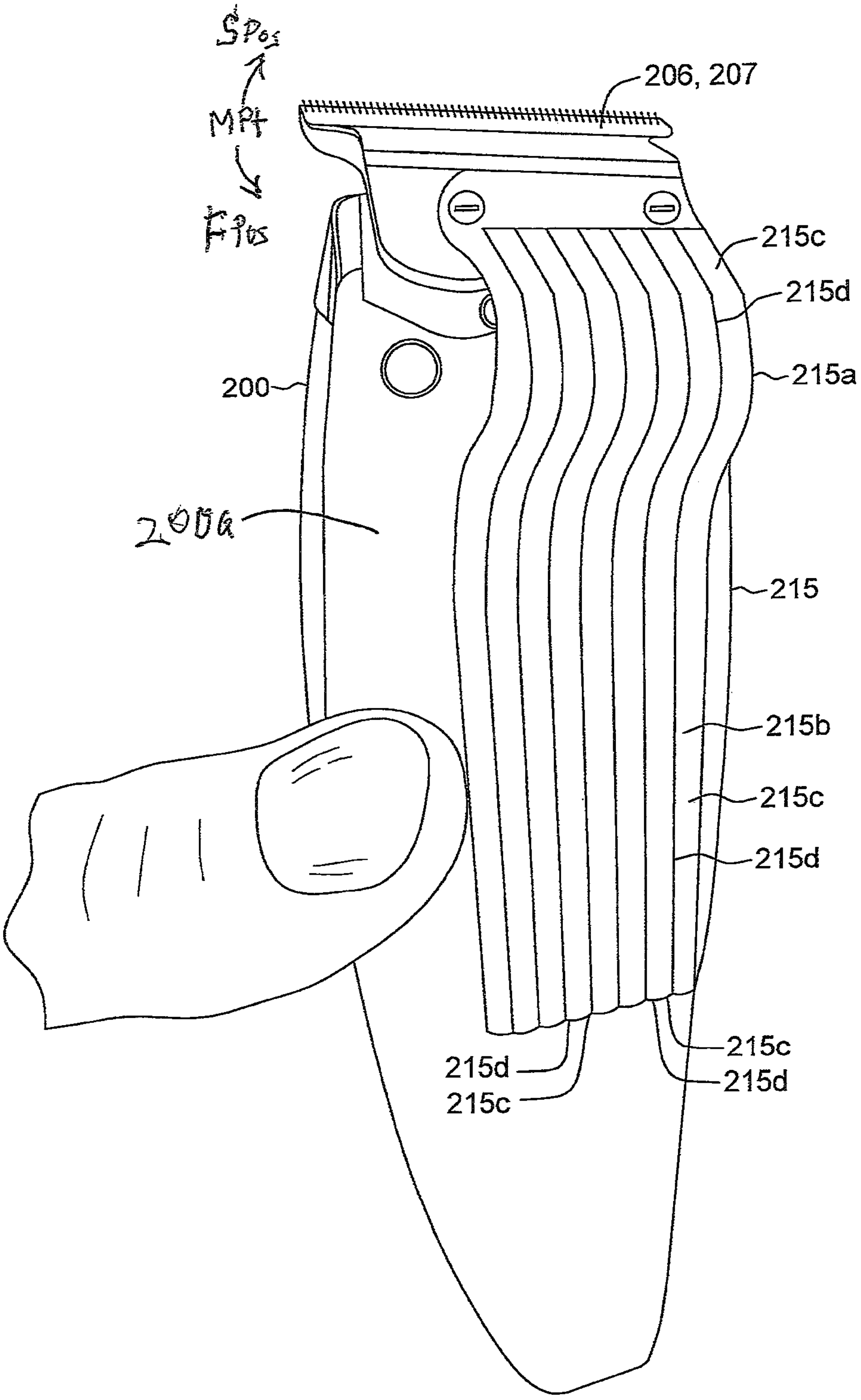
FIG. 18 is a close-up perspective view of the flexing bushing belt flexor associated with the pivoting blade set.
Figure 19A:
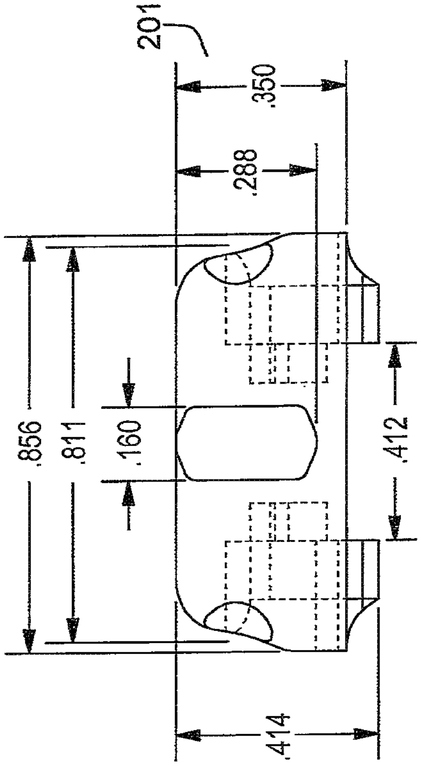
FIGS. 19A, 19B, 19C, 19D are top, perspective, side and end views of the driver bracket.
Figure 19B:
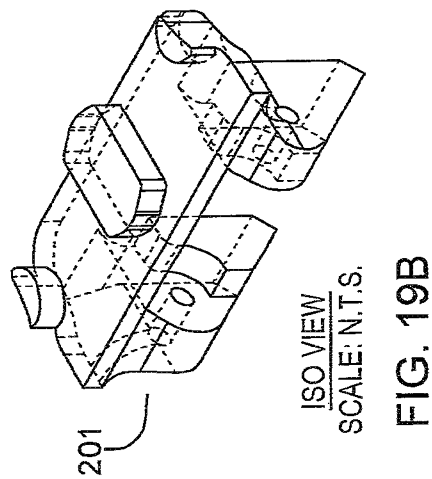
Figure 19C:
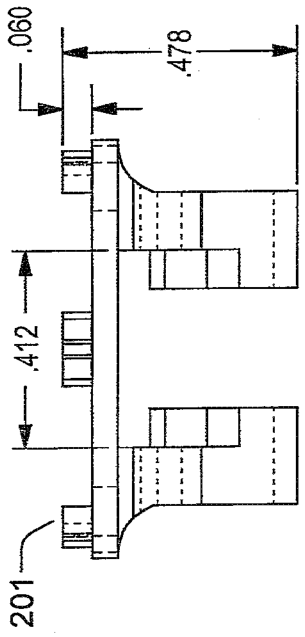
Figure 19D:
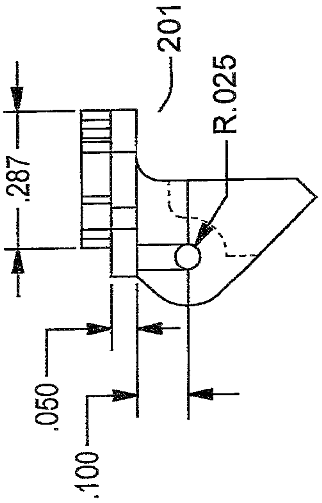
Figure 20B:
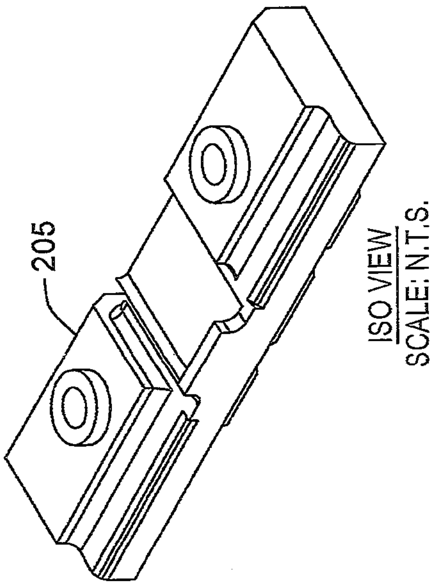
FIGS. 20A, 20B, 20C, 20D are top, perspective, side and end views of the pivot plate.
Figure 20D:
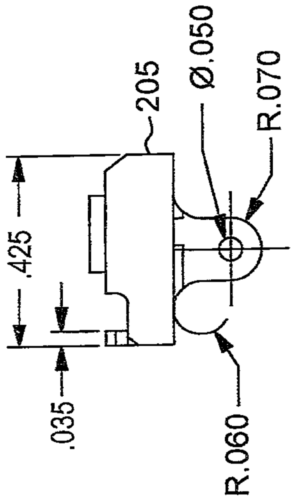
Figure 20A:
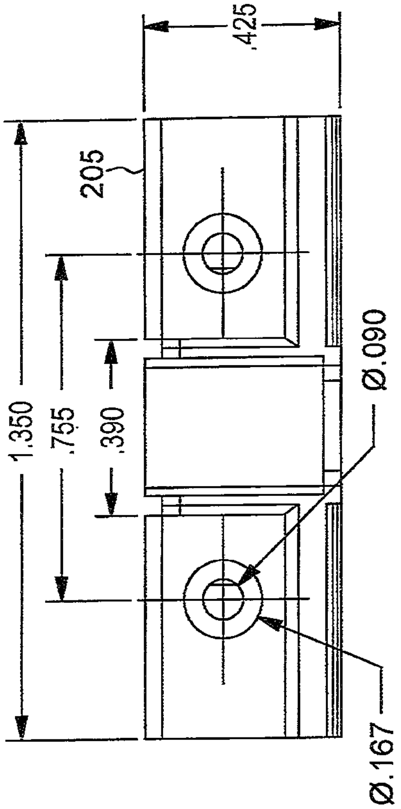
Figure 20C:
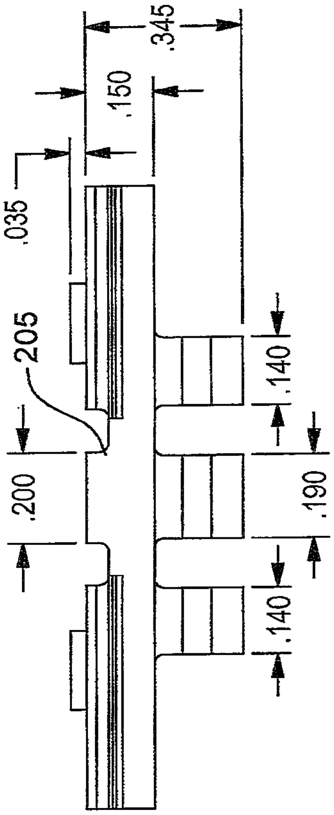
Figure 21A:
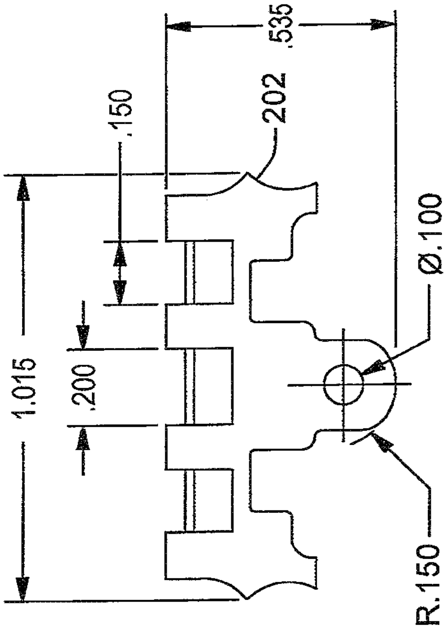
FIGS. 21A, 21B, 21C, 21D are top, perspective, side and end views of the pivot mount.
Figure 21B:
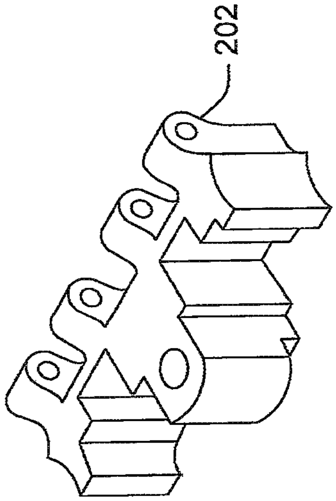
Figure 21C:
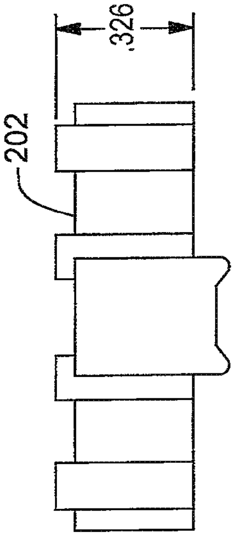
Figure 21D:
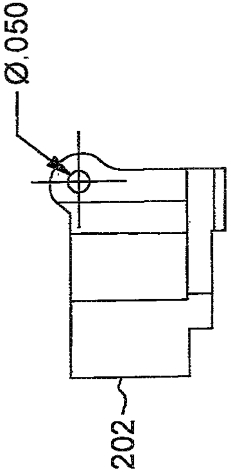
Figure 22B:
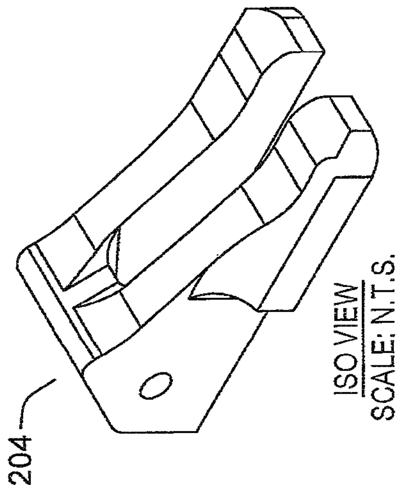
FIGS. 22A, 22B, 22C, 22D are top, perspective, side and end views of the driver.
Figure 22D:
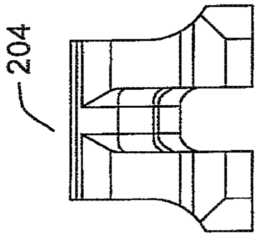
Figure 22A:
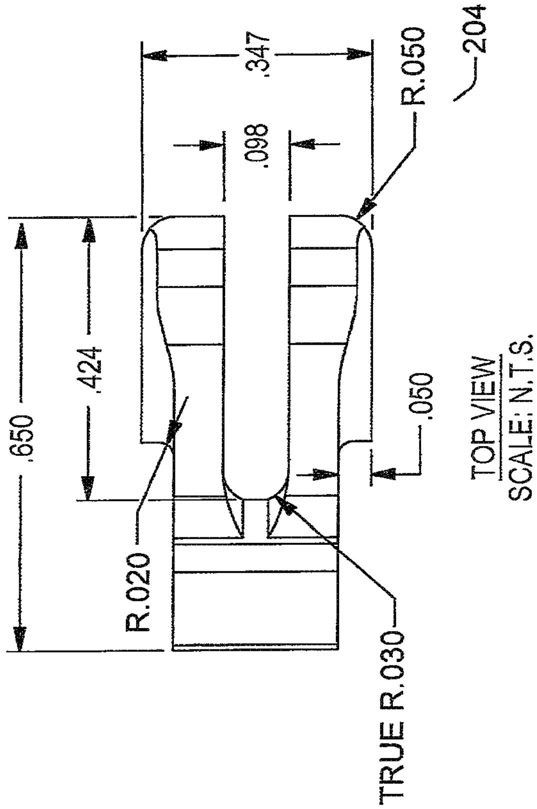
Figure 22C:
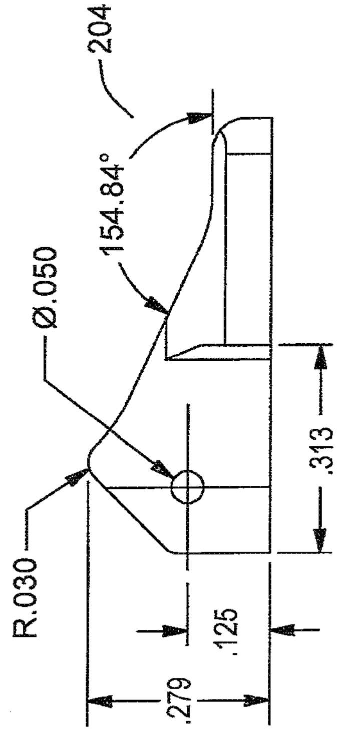
Figure 23A:
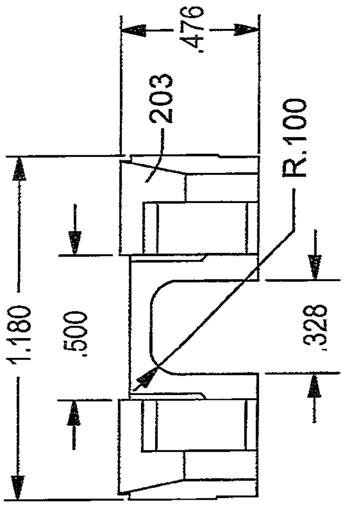
FIGS. 23A, 23B, 23C, 23D are top, perspective, side and end views of the inner cover/shroud.
Figure 23B:
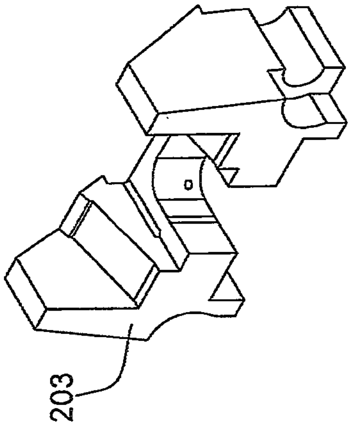
Figure 23C:
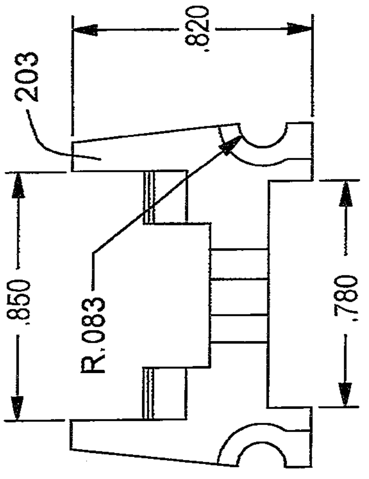
Figure 23D:
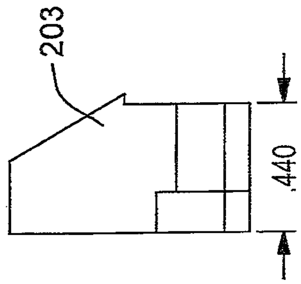

FIGS. 14-23D show a further flexing hair clipper 200 with an external handle body housing 200*a* having an interior handset housing 208 therein. In this further alternate embodiment, the blade set 206, 207 is also capable of flexing around the contours of the customer's hair, scalp and skull. As shown in FIG. 17, power is applied to the blade set 206, 207 by a conventional motor M (as in FIG. 17) within the interior handset housing 208 of the hair clippers 200. The motor M may be activated by conventional tap switches, rotating wheel switches, or other manually activated switches S. Instead of a flexible cylindrical neck, as in the aforementioned flexing embodiment of FIGS. 8-13, in this embodiment, in FIGS. 14-23D, the blade set 206, 207 is pivotable upward, as shown in FIG. 18, from a first lower position FPos, through a mid-point MPt, to a second raised position SPos, whereby, as also shown in FIG. 18, the blade set 206, 207 is optionally controlled by a semi-rigid flexible belt bushing piece 215, i.e. known as a "flexor" 215 which is positioned on the bottom surface of the external handle body housing 200*a* of clippers 200. The flexor 215 includes from top to bottom a series of joined, parallel rippled wave-like rounded peaks 215*c* and valleys 215*d*. The flexor 215 includes a semi-rigid flexible curved distal end 215*a*, attached to a linear proximal body portion 215*b*. The semi-rigid flexible curved distal end 215*a* biases against a portion of the blade set 206, 207 to urge the blade set 206, 207 to move around the contours of the customer's hair, scalp and skull during the process of a hair cutting. The flexor 215 counteracts the propensity of the upwardly pivoted blade set 206, 207 to pivot outwardly and holds the blade set 206, 207 in a mid-point position so that the blade set 206, 207 can push in or push out while moving over the three-dimensional curvature of the hair, scalp and skull of the customer. The semi-rigid flexible curved distal end 215*a* of the flexor 215 gently pushes the pivoted blade set 206, 207 to a flexing motion or a relaxed motion against the hair, scalp and skull of the customer. The linear extending proximal body portion of the flexor 215 stabilizes the flexor 215 against the body of external handle body 200*a* of the hair clipper 200.

Although dimensions of the component parts of the hair clipper 200 may vary, FIGS. 19A, 19B, 19C, 19D, 20A, 20B, 20C, 20D, 21A, 21B, 21C, 21D, 22A, 22B, 22C, 22D, 23A, 23B, 23C and 23D each show preferred dimensions expressed in inches, or portions of inches, where the dimension areas indicate the decimal portions of an inch, including radii indicated with a capital "R" preceding each of the radii.

Figure 15:
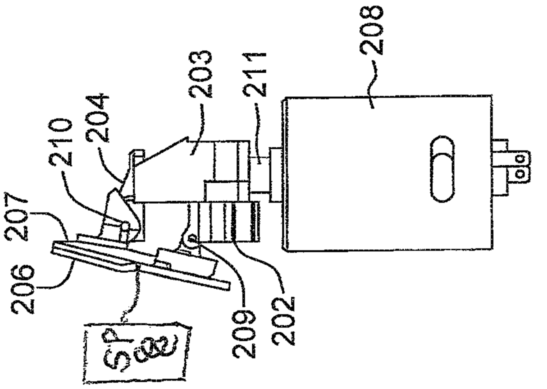
FIG. 15 is a side view thereof.
Figure 14:
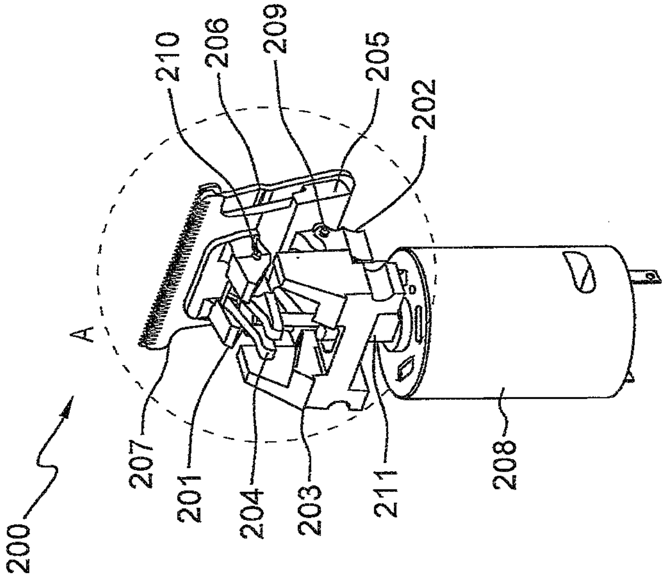
FIG. 14 is a perspective view of an alternate embodiment for a hair clipper with a flexing pivoting blade set.

The moving blade 206 of the blade set 206, 207 moves horizontally against the stationery blade 207 of the blade set 206, 207 during the cutting of the hair. As shown in FIG. 15, a spring SP is provided to hold the movable blade 206 and the stationery blade 207 closely adjacent and parallel to each other. The spring SP is located under a driver 204 which has a driver bracket 201 attached to the blade set 206, 207. The driver 204 is connected to the driver bracket 201, which pivots about driver pin 210 by the force of driver 204. The driver 204 moves the movable blade 206 against the stationery blade 207 to facilitate cutting of the hair on the scalp and skull of the customer. The movable blade 206 is moved closely adjacent and parallel to the stationery blade 207, by an eccentric rotating cam 211 which is powered by the motor M (such as for example the motor M in the other embodiment shown in drawing FIG. 8) inside the interior handset housing 208 of the hair clippers 200. Motor "M" is powered by a power source being one of a battery B within the interior handset housing 208 or an AC driven corded power source AC, (or equivalent DC power supply for corded versions) which supplies power to both reciprocating blade motor "M", or, as also shown in FIG. 8, to a stepper motor 145, through a step driver module 160.

The eccentric cam 211 causes the driver 204 to move the movable blade 206 of the blade set 206, 207 adjacent to the stationery blade 207 in subsequent left and right sets of multiple parallel movements, during cutting of the hair of the scalp and skull of the customer. The rod 211*a* of the rotating eccentric cam 211 is positioned between the open U-shaped driver 204 and causes the movement of the movable blade 206 against the adjacent surface of the stationery blade 207.

The U-shaped driver 204 is mounted to a driver bracket 201 which is attached to the blade set 206, 207, and urges the blade set 206, 207 forward or back in an infinitely variable range of motion, limited by the pushing or release of the bushing belt flexor 215 against the pivoted blade set 206, 207. A pivot mount 202 is attached to a pivot plate 205 which pivots the blade set 206, 207 and pivots about a pin 209, which connects the movable pivot plate 205 and blade set 206, 207 to the stationery pivot mount 202, which is mounted to a base. The interior handset housing 208, supports motor "M" within, and the interior handset housing 208, is preferably connected to external handle body housing 200*a*, as shown in FIG. 18, which covers the two sides and front of the pivoting mechanisms of the hair clipper 200 in front of the pivotable blade set 206, 207, including U-shaped driver 204 communicating with rod 211*a* of the rotating eccentric cam 211. Hair clipper 200 also optionally includes flexing bushing belt flexor 215 on the bottom fourth side of the external handle body housing 200*a* of the hair clipper 200.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A flex hair clipper comprising:

a manually graspable external handle body housing an internal housing having a motor with an eccentric cam;

a driver in operative engagement with the eccentric cam;

a blade set including a movable blade and a stationary blade, the movable blade being in operative engagement with the driver so that the movable blade moves back and forth against the stationary blade via operation of the eccentric cam of the motor;

a pivot plate pivotally connecting the blade set to the handle body so that the blade set pivots along an arcuate path between an inward first position to an outward second position; and a semi-rigid flexor having a semi-rigid flexible curved distal end and a linear body portion defining a proximal end of the flexor, the semi-rigid flexible curved distal end is attached to a back side of the blade set, the linear proximal body portion is attached to a backside of the handle body, the flexor counteracts a propensity of the blade set to move to the outward second position so that the blade set is held in a middle position between the first position and the second position so that the blade set can pivot inward toward the first position or outward toward the second position in response to engaging contours of a user during use.

2. The flex hair clipper as in claim 1, the flexor includes a series of joined, parallel rippled peaks and valleys extending from the distal end of flexor to the proximal end of the flexor.

3. The flex hair clipper as in claim 1, further comprising the motor being powered by a power source being selected from a group consisting of a battery or an AC driven corded power source.

4. The flex hair clipper as in claim 1, further comprising a spring being provided to hold the movable blade and the stationary blade adjacent and parallel to each other, the spring being located adjacent to the driver, a driver bracket attached to the movable blade, and the driver is pivotally connected to the driver bracket via a driver pin to define the operative engagement between the movable blade and the driver.

5. The flex hair clipper as in claim 1, the handle body includes a stationary pivot mount, the pivot plate is pivotally connected to the stationary pivot mount via a pin to define the pivotal connection between the blade set and the handle body.

* * * * *